F. O. WELLS.
THREAD CUTTING TOOL.
APPLICATION FILED APR. 12, 1915.
1,165,822.
Patented Dec. 28, 1915.
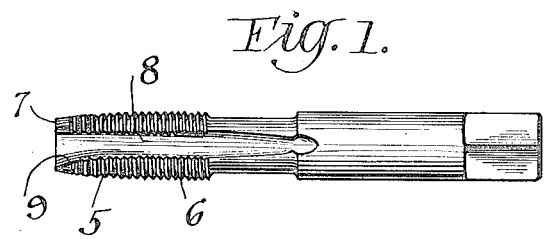
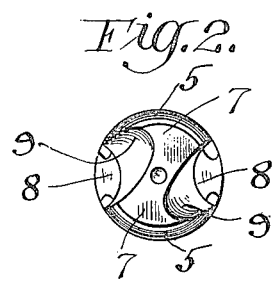
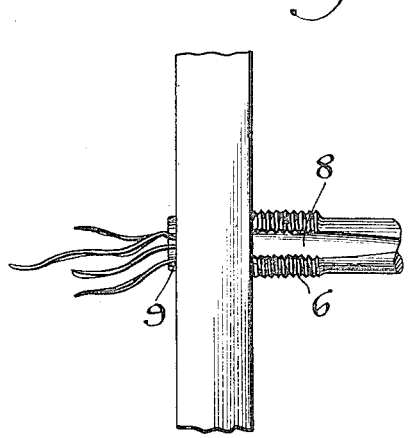
INVENTOR
Frank O. Wells
BY
ATTORNEYS

UNITED STATES PATENT OFFICE.

FRANK O. WELLS, OF GREENFIELD, MASSACHUSETTS.

THREAD-CUTTING TOOL.

1,165,822.   Specification of Letters Patent.   Patented Dec. 28, 1915.

Application filed April 12, 1915.   Serial No. 20,646.

*To all whom it may concern:*

Be it known that I, FRANK O. WELLS, a citizen of the United States, residing at Greenfield, Massachusetts, have invented new and useful Improvements in Thread-Cutting Tools, of which the following is a specification.

This invention relates to thread-cutting tools and in particular to taps and dies.

In the use of taps and dies of the usual construction, the metal shavings cut from the work are chopped into chips before they can be discharged through the flutes of the tool and thus obstruct the operation of the latter. The presence of such chips is especially objectionable in a tool having combined cutting and guiding threads, such as is covered generically by my co-pending application, Serial Number 878,885, filed December 24, 1914, for the reason that the chips tend to clog the guiding threads and prevent free pitch-preserving movement of the same through the previously cut threads of the work.

It is, therefore, my purpose to provide simple means which may be embodied conveniently in the construction of taps and dies for deflecting the shavings axially and forwardly from the cutting threads, so that they will worm their way out through the flutes of the tool intact and will thus leave the innermost portions of the flutes clean and free from shavings or chips.

To these ends the invention consists in the combination and construction of parts hereinafter more particularly set forth and claimed, and illustrated in the accompanying drawing, in which;

Figure 1 represents a side elevation of a tap constructed in accordance with the invention; Fig. 2 is an end elevation of the same; and Fig. 3 is a side elevation of the tap in use in threading an opening in a metal plate.

In the drawing, a tap constructed in accordance with the invention alone is illustrated, but it is to be understood that dies as well may embody the present invention in their construction. In this instance, the tap is shown as being constructed so as to provide cutting threads 5 and leading threads 6 disposed in rear of the former threads with respect to the direction of movement of the same axially. These threads are divided into sections upon the respective lands 7 of the tool by the intervening flutes 8. The cutting thread sections alone are chamfered and given the necessary relief and rake. The radial wall of each flute 8 at the advance side of the succeeding land 7 with respect to the direction of rotation of the tool, is constructed so as to be inclined as at 9 coextensive with the advance ends of the cutting thread sections and furthermore to be axially convex. These inclined deflecting surfaces merge into the leading end face of the tool and are intended to deflect the shavings in an outward direction axially through the flutes as they are cut from the work. In order to give the cutting thread sections the necessary rake, and also to cause the cut shavings to be deflected also in an inward direction radially, the inclined surfaces 9 are also formed radially concave, as indicated clearly in Fig. 2.

An equally important feature of the invention is the beveling of the inner surfaces of the respective flutes so that they converge toward one end of the tool and merge with the corresponding beveled surfaces 9 of the lands. Owing to this "double-angle" beveling of the chip-deflecting surfaces of the tool, in combination with the transversely concave formation of these surfaces particularly, the cut chips will be deflected in a most efficient manner toward the forward end of the tool and drawn inwardly toward the axis of the tool, in the case of a tap, and outwardly away from the work, in the case of a die. The transverse curvature of these deflecting surfaces is thus appropriately termed the "hook" of the tool.

A tap or die constructed in the manner set forth will operate freely and without choking when in use, the shavings being ejected axially and comparatively intact, somewhat in the manner illustrated in Fig. 3 of the drawing.

Having thus described my invention, what I claim as new and desire to secure by Letters-Patent is:

1. A thread-cutting tool comprising a member provided with axially straight lands and flutes, each land presenting cutting thread sections and having an axially inclined deflecting surface disposed at the advance ends of the thread sections.

2. A thread-cutting tool comprising a member provided with leading thread sections and cutting thread sections disposed in advance of the same, the member having an axially inclined deflecting surface disposed at the advance ends of the cutting thread sections.

3. A thread-cutting tool comprising a member provided with axially straight lands and flutes, each land presenting cutting thread sections and having an axially inclined deflecting surface disposed at the advance ends of the thread sections, the said surface being formed radially concave.

4. A thread-cutting tool comprising a member provided with lands and flutes, each land presenting cutting-thread sections and having its substantially radial face at the advance ends of the thread sections beveled axially in a direction opposite to that taken by the thread, the inner surface of each flute being also beveled axially so that all the said flute surfaces converge toward one end of the tool, the corresponding beveled land and flute surfaces being formed so as to merge.

5. A thread-cutting tool comprising a member provided with lands and flutes, each land presenting cutting-thread sections and having its substantially radial face at the advance ends of the thread section beveled axially in a direction opposite to that taken by the thread, the inner surface of each flute being also beveled axially so that all the said flute surfaces converge toward one end of the tool, the corresponding beveled land and flute surfaces being formed so as to merge and being transversely concave.

In testimony whereof I have signed my name to this specification in the presence of two subscribing witnesses.

FRANK O. WELLS

Witnesses:
CHARLES N. STODDARD,
JESSIE S. BLACKMER.

Copies of this patent may be obtained for five cents each, by addressing the "Commissioner of Patents Washington, D. C."